W. A. VAN BERKEL.
MEAT CLAMP FOR SLICING MACHINES.
APPLICATION FILED AUG. 7, 1915.
1,175,025.
Patented Mar. 14, 1916.
2 SHEETS—SHEET 1.
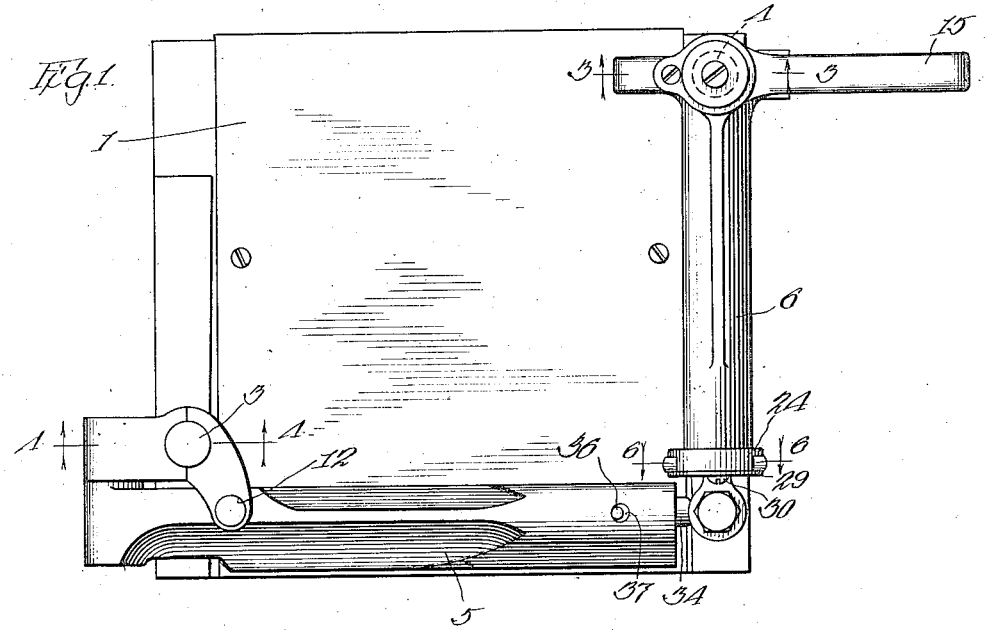
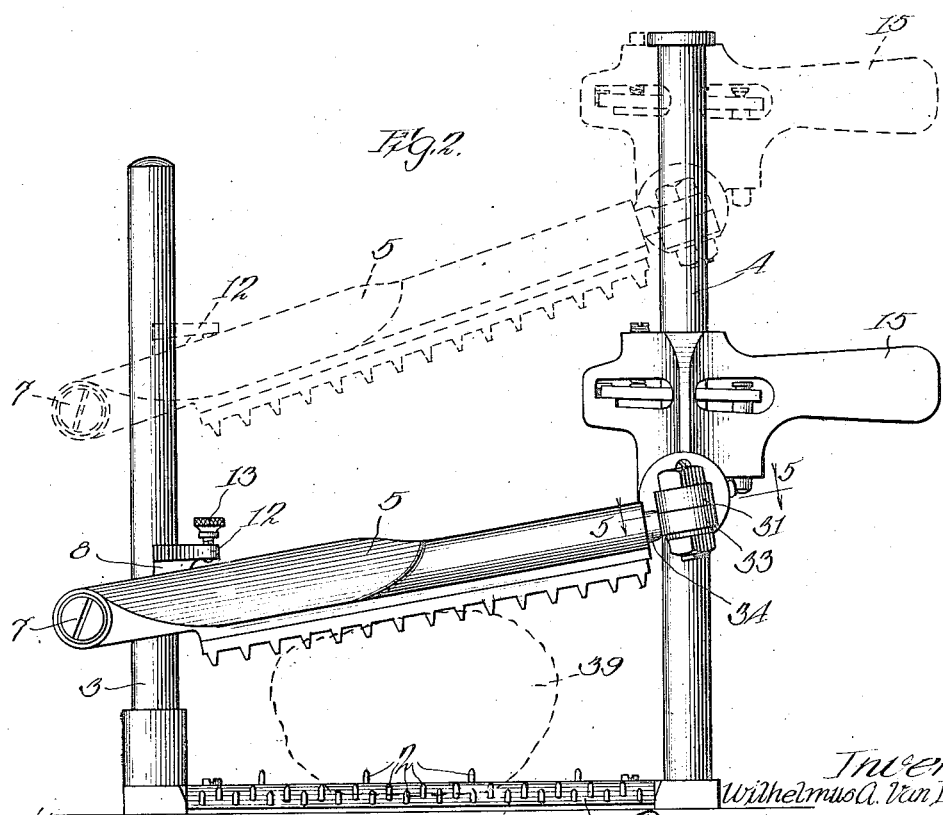
Inventor
Wilhelmus A. Van Berkel

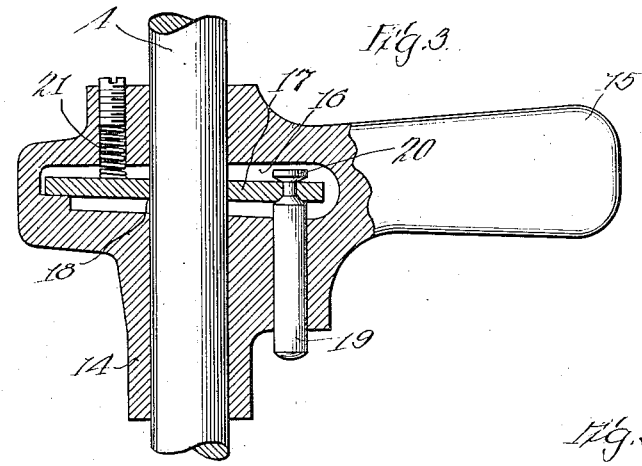
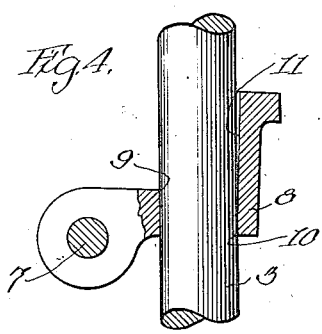
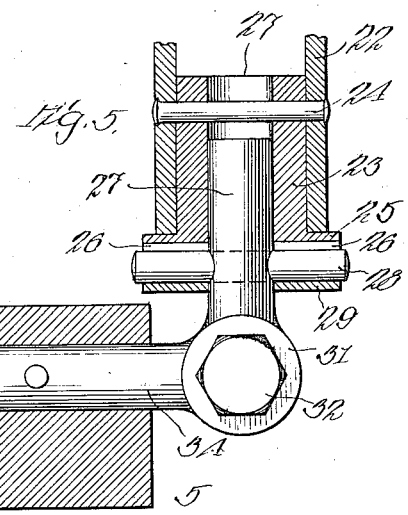
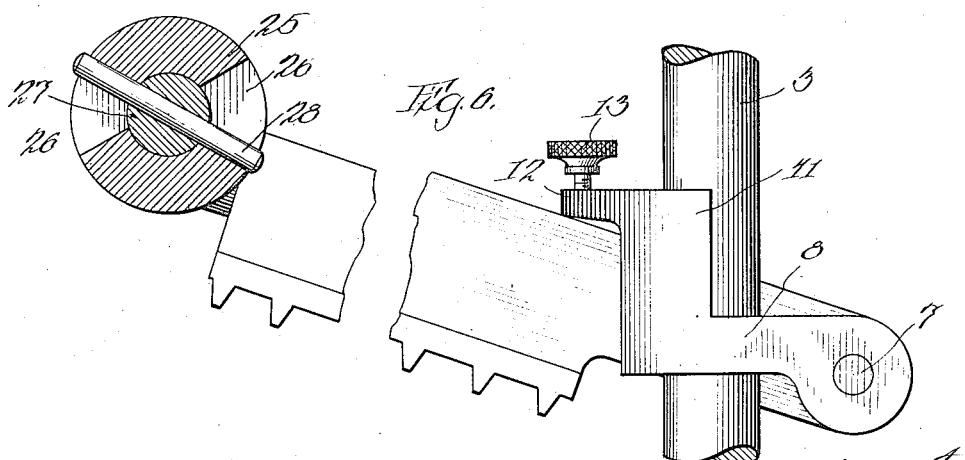

UNITED STATES PATENT OFFICE.

WILHELMUS A. VAN BERKEL, OF ROTTERDAM, NETHERLANDS, ASSIGNOR TO U. S. SLICING MACHINE CO., OF CHICAGO, ILLINOIS, A CORPORATION OF ILLINOIS.

MEAT-CLAMP FOR SLICING-MACHINES.

1,175,025.

Specification of Letters Patent. Patented Mar. 14, 1916.

Application filed August 7, 1915. Serial No. 44,149.

*To all whom it may concern:*

Be it known that I, WILHELMUS A. VAN BERKEL, a subject of the Queen of the Netherlands, and a resident of Rotterdam, Netherlands, have invented certain new and useful Improvements in Meat-Clamps for Slicing-Machines, of which the following is a specification.

This invention relates to a clamping device for a meat table designed especially for use in connection with slicing machines, but capable of use in other relations.

The invention consists substantially in the combination and arrangement of parts described in the following specification, shown in the accompanying drawings, and more particularly pointed out in the appended claims.

In the drawings, Figure 1 is a top plan view of a meat table provided with a clamp embodying the present invention. Fig. 2 is a front elevation of the meat table shown in Fig. 1 showing the meat clamp in two positions. Fig. 3 is a fragmentary section on line 3—3 of Fig. 1. Fig. 4 is a fragmentary section on line 4—4 of Fig. 1. Fig. 5 is a fragmentary section on line 5—5 of Fig. 2. Fig. 6 is a fragmentary elevation with parts in section, on line 6—6 of Fig. 1.

This invention relates to meat tables such as are shown in my prior applications, Ser. Nos. 770,849 and 794,367, and is an improvement on the devices there shown.

In the drawings, the numeral 1 represents a meat supporting table such as is used for holding the meat upon the reciprocating frame of a slicing machine. The table is provided near its forward edge with projections or teeth 2, for contacting with the meat to prevent movement of the meat relative to the table. An upright guide bar 3 is secured to the table at one side thereof and near the forward edge and a second guide bar 4 extends upwardly from the opposite side of the table at a position near the rear edge thereof. It is thus seen that the guide bars 3 and 4 are positioned at diagonally opposite corners of the meat table. A clamping bar 5 is mounted on the guide bar 3 in a manner which will be described, and extends across the front edge of the table in a direction substantially parallel with the cutting plane of the slicing knife, as shown in Fig. 1. A bracket 6 is carried on the guide bar 4 and extends along the side of the plate 1 toward the forward edge thereof and carries at its forward end one end of the clamping bar 5. In this way the clamping bar 5 is supported substantially parallel with the front edge of the meat table and yet a free space is left at one side of the table and at the front edge thereof for the insertion of pieces of meat to be sliced, this space being unobstructed by any upright support for the clamping bar.

The end of the bar 5 carried by the upright 3 is pivotally mounted at 7 on the clamping collar 8 which surrounds the guide bar 3. As will be seen from Figs. 4 and 6, the clamping collar 8 is loosely mounted for sliding movement on the guide bar 3 and is adapted, under certain conditions, to clutch the bar 3 to prevent movement of the collar in an upward direction thereon. The pivotal support 7 for the bar 5 is located at one side of the central line of the guide 3 and it will be apparent that if pressure is exerted in an upward direction on the pivot 7, the portions 9 and 10 of the collar 8 will bite into the bar 3 and prevent movement of the collar thereon. The side of the collar opposite the pivot 7 is provided with an elongated bearing portion 11. Because of this elongated portion, pressure downwardly on the pivot 7 will not cause a clutching action of the collar upon the bar 3, but will merely slide the collar downwardly upon the bar. Projecting from the upper portion of the part 11 of the collar 8, and arranged to overhang the clamping bar 5, as shown in Figs. 1, 2 and 6, is an extension or lug 12. This lug may be provided with an adjustable thumb screw 13 for contacting with the upper surface of the bar 5. It will be seen from the broken line position of the bar 5 in Fig. 2, that if this bar is held at the proper angle, the extension 12 will rest upon the bar at one side of the guide 3, while the pivot 7 connects the bar 5 with the collar 8 on the opposite side of the guide 3. In this position, the collar 8 is held in true alinement with the guide 3 and if the bar 5 is moved upwardly or downwardly while it is held at this angle, it is apparent that the collar 8 will slide freely on the guide bar 3.

As will be seen from Fig. 3, the bracket 6 is provided with an elongated sleeve 14 slidably mounted on the upright guide member 4, and a hand hold 15 projects laterally from this sleeve. Mounted within an opening 16 in the sleeve 14, is a clutch plate 17 having an opening 18 through which the guide bar 4 passes. When the plate 17 is in the position shown in Fig. 3, it is apparent that it will prevent upward movement of the sleeve 14 and the bracket carried thereby. A finger bar 19 is provided by which the clutch plate 17 may be raised into position to permit free movement of the sleeve 14 upon the bar 4. The bar 19 is provided with a stop 20 adapted to strike the upper surface of the opening 16 when the plate 17 is in proper position to permit free movement of the sleeve 14 upon the guide 4. A spring 21 normally holds the plate 17 in position to clutch the guide bar 4 to prevent upward movement of the sleeve upon the bar. It is thus seen that pressure on the hand hold 15 will cause the sleeve 14 and the bracket 6 to slide freely downwardly on the bar 4 and the clutch plate 17 will automatically hold the bracket from any return movement. Upward movement of the bracket is secured by pressing on the end of the pin 19 and lifting upwardly on the handhold 15. The weight of the bracket 6 and the clamping bar 5 carried at the end thereof produces a sufficient binding action of the sleeve 14 upon the guide 4 to hold the bracket and bar from sliding downwardly along the guide due to the action of gravity but a very slight pressure on the hand hold 15 near the guide 4 is sufficient to press these parts downwardly whenever desired.

It is very desirable in a device of this character that the clamp may be operated by one hand, leaving the other hand free to position the meat upon the table. From the description above, it will be seen that the sleeve 14 and the bracket 6 may be easily adjusted by one hand, and it is desirable that the movement of the hand hold 15 will also control the adjustment of the clamping bar 5 upon the guide 3 and also about the pivot 7. To accomplish this, a special form of connection between the end of the bracket 6 and the clamping bar 5 is provided. The bracket 6 comprises a hollow shell 22 and secured to the interior of this shell at the end of the bracket, is a member 23 held in place by a pin 24 and having an enlargement 25 at the outer end thereof. Radial slots 26 are cut in the outer surface of the enlargement 24 as shown in Figs. 5 and 6. A pin 27 is mounted in a central opening in the member 23 and a cross pin 28 passes transversely through the pin 27 and is arranged to lie in the radial slots 26 to limit the pivotal movement of the pin 27 in the member 23. A washer 29 is fastened to the outer surface of the enlargement 24 by screws 30 (Fig. 1) to hold the pin 27 in place. The pin 27 carries at its outer end a flattened eye 31 through which a bolt 32 passes. Supported on the lower end of the bolt 32 is a second eye 33 carried by a pin 34 which projects into and is secured in the end of the clamping bar 5. The pin 34 is held in the clamping bar 5 by a cross pin 36 which passes through the pin 34 and extends into the opening 37 in the bar 5. The opening 37 is made somewhat larger than the pin 36 to permit slight movement of the pin 34 relative to the bar 5. It will thus be seen that the clamping bar 5 is capable of limited pivotal movement about the pin 27 as a center, the amount of this movement being determined by the width of the radial slots 26 in the enlargement 24 of the member 23.

Assuming, now, that the parts of the clamping device are in the position shown in broken lines in Fig. 2, and a piece of meat 39 is placed upon the meat table 1, the operator grasps the hand hold 15 with one hand and presses it downwardly. The bracket 6 moves freely in this direction since the clutch plate 17 is prevented from resisting movement in this direction by the stop 20. The collar 8 also slides freely in a downward direction, since downward pressure on the pivot 7 throws the long bearing surface 11 in contact with the bar 3 and thus alines the collar with this bar, permitting free movement. In this way, the operator is enabled by the use of one hand alone to bring the clamping bar into position on top of the piece of meat 39. When the bar 5 strikes the meat 39, the collar 8 is prevented from further downward movement and pressure exerted on the hand hold 15 has a tendency to pivot the bar 5 about the piece of meat 39 as a fulcrum and force the pivot 7 in an upward direction. This causes the collar 8 to clutch the guide 3 and upward movement of the pivot 7 is thus prevented. Pressure on the hand hold 15 therefore merely has the effect of forcing the teeth on the bar 5 into contact with the meat and firmly clamping the meat upon the table. The bracket 6 and the clamping bar 5 are held in their clamping position by the clutch plate 17. In this way the meat is firmly clamped upon the table, as shown in Fig. 2. When it is desired to release the clamp, the operator grasps the hand hold 15, presses the finger bar 19 to release the clutch plate 17, and lifts upwardly. The first effect of this upward movement is to turn the bar 5 about the pivot 7, the pin 27 at the same time rotating in the opening in the member 23. As the sleeve 14 is further slid in an upward direction, the top of the bar 5 is brought into contact with the thumb screw 13 in the extension 12 of the collar 8 and in this way the collar 8 is moved into alinement with the guide bar 3. At the same time that the collar 8 is placed in position to slide freely upon the guide bar 3, the cross pin 28 strikes the shoulders formed by the radial openings 26 in the member 23 and thus further pivotal movement of the bar 5 is prevented. As the operator continues to lift the bracket 6, the bar 5 is held at a fixed angle relative to the guide members 3 and 4 by the pin 28 resting on the shoulders in the radial slots 26. In this way, the bar 5 is lifted bodily by the bracket 6 and during this lifting operation it is held at the proper angle to support the collar 8 in proper alinement with the guide 3, so that it slides freely thereon. In this way, the entire clamping device, including the sleeve 14, the bracket 6, the clamping bar 5, and the clutch collar 8, are lifted in unison by the movement of the single hand of the operator which holds the handle 15. It will thus be apparent that the clamping and unclamping of the meat are both readily accomplished by the simple up and down movement of the single handle 15 controlled by one hand of the operator while the other hand is left entirely free to position the meat and to attend to any other operations that may be necessary.

What I claim is:

1. In a machine for slicing meat, a meat-clamping bar, a fixed guide for one end of said bar, an extension movably secured to the other end of said bar at a horizontal angle therewith, and means attached to said extension for adjusting both ends of said bar.

2. In a machine for slicing meat, a supporting table, a bar for clamping meat upon said table, a fixed guide for one end of said bar, an angular extension secured to the other end of said bar, and means attached to said extension for adjusting both ends of said bar relative to said table and in a direction lateral to the direction of said extension.

3. In a machine for slicing meat, a guide, a clamping bar having one end thereof adjustably mounted on said guide, and a support for said clamping bar movably attached to the other end of said bar for adjusting said first mentioned end thereof on said guide.

4. In a machine for slicing meat, a meat clamping bar, and an extension movably attached to one end of said bar for simultaneously adjusting both ends thereof and also for adjusting one end thereof independently of the other.

5. In a machine for slicing meat, a guide, a meat clamping bar having one end adjustably mounted on said guide, and means pivotally attached to the other end of said meat clamping bar for simultaneously adjusting both ends thereof and also for adjusting the end not mounted on said guide independently of the end so mounted.

6. In a machine for slicing meat, a vertical guide bar, a collar loosely surrounding said guide bar and adapted to clutch said guide bar to prevent movement of said collar thereon in one direction, a meat clamp pivotally carried by said collar, and means for preventing the clutching action of said collar when said meat clamp is in one position relative to said guide bar.

7. In a machine for slicing meat, a guide, a meat clamp means adjustably mounted on said guide for holding said meat clamp, and means controlled by said meat clamp for preventing movement of said holding means on said guide.

8. In a machine for slicing meat, a guide bar, a clutch collar mounted on said guide bar and adapted to clutch said guide bar to prevent movement of said collar in one direction, a meat clamp pivotally carried by said collar, and means controlled by said meat clamp for preventing the clutching action of said collar.

9. In a machine for slicing meat, a guide, a meat clamp, and connecting means slidable on said guide and pivotally connected to said meat clamp and controlled by the angular position of said clamp relative thereto so as to permit movement in one direction of said clamp on said guide, when said clamp is in one position, and to prevent movement of said clamp in said direction when said clamp is in other positions.

10. In a machine for slicing meat, a guide bar, a clutch collar mounted to slide on said guide bar and adapted to clutch said guide bar to prevent movement of said collar in one direction thereon, a clamping bar carried by said clutch collar, and means operable by said clamping bar, when in one position, for preventing clutching action of said collar.

11. In a machine for slicing meat, a guide bar, a clamping bar pivotally and slidably mounted on said guide bar, means for preventing movement of said clamping bar relative to said guide bar, in one direction, and means actuated by said clamping bar when in a certain angular position relative to said guide bar for causing said movement preventing means to permit movement in said direction.

12. In a machine for slicing meat, a guide bar, a clamping bar pivotally and slidably mounted on said guide bar, and a device adapted to permit sliding movement of said clamping bar on said guide bar when said bars are at a certain angle with one another, and to prevent sliding movement of said bars relative to one another, in one direction, when said bars are at other angles relative to one another.

13. In a machine for slicing meat, a guide bar, a clamping bar pivotally and slidably mounted on said guide bar, a device for preventing movement of said clamping bar in one direction along said guide bar but arranged to permit movement in said direction when said clamping bar is in a certain angular position relative to said guide bar, and means for holding said clamping bar in said angular position to permit movement thereof.

14. In a machine for slicing meat, a guide bar, a clamping bar movable longitudinally of said guide bar when positioned at a certain angle therewith, means for preventing movement of said clamping bar in one direction when positioned at other angles with said guide bar, and means for moving said clamping bar, said means being adapted to automatically hold said bar at said certain angle relative to said guide bar when moved in said direction.

15. In a machine for slicing meat, a guide bar, a clamping bar having one end thereof pivotally and slidably mounted on said guide bar, means for preventing movement of said clamping bar in one direction on said guide bar, but adapted to permit such movement when said clamping bar is at a certain angle with said guide bar, and a device attached to the other end of said clamping bar arranged to hold said clamping bar at said angle and to move said clamping bar along said guide bar.

16. In a machine for slicing meat, a guide bar, a collar loosely surrounding said guide bar, a clamping bar pivotally connected to said collar with the axis of the pivot at one side of the center of said guide bar whereby pressure on said clamping bar will cause said collar to bind on said guide bar and contacting means on said collar and clamping bar for holding said collar out of clamping position.

17. In a machine for slicing meat, a guide bar, a collar loosely surrounding said guide bar and having a long bearing surface and a short bearing surface on opposite sides of said guide bar, a clamping bar pivoted to said collar with the axis of the pivot at one side of the center of said guide bar and opposite the long bearing surface of said collar, whereby pressure on said clamping bar, in one direction, will cause said collar to slide on said guide bar, and pressure on said clamping bar, in the opposite direction, will cause said collar to bind on said guide bar and prevent movement of said clamping bar.

18. In a machine for slicing meat, a guide bar, a collar loosely surrounding said guide bar, a pivot carried by said collar, having its axis on one side of the center of said guide bar, a stop on said collar opposite said pivot, and a clamping bar carried by said pivot and adapted in one position to contact with said stop.

19. In a machine for slicing meat, a guide bar, a collar mounted on said guide bar, a clamping bar carried by said collar and adapted in one position to hold said collar in position to slide freely on said guide bar, and means for automatically holding said clamping bar in said position when moved in one direction and for moving it along said guide bar.

20. In a machine for slicing meat, a guide bar, a clamping bar, means mounted on said guide bar for carrying one end of said clamping bar and adapted to slide freely on said guide bar when said clamping bar is held in one position relative to said guide bar, and means secured to the other end of said clamping bar for moving said bar and adapted to hold said bar in position to cause the means for carrying the first mentioned end thereof to slide freely on said guide bar.

21. In a slicing machine, a guide bar, a clutch collar slidably mounted on said guide bar, a clamping bar pivotally carried on said clutch collar, means for automatically holding said clutch collar in position to slide freely on said guide bar when said clamping bar is at one angular position relative to said guide bar, and means attached to said clamping bar for sliding it on said guide bar, said means being adapted to hold said clamping bar in said before-mentioned angular position.

22. In a slicing machine, a guide bar, a clutch collar on said guide bar, a pivot on said clutch collar with the axis thereof at one side of the center of said guide bar, a stop on said clutch collar on the opposite side of said guide bar from said pivot, a clamping bar mounted at one end on said pivot and adapted to swing about said pivot as a center into position to contact with said stop to hold said clutch collar in alinement with said guide bar, a movable pivotal support for the opposite end of said clamping bar, and means for limiting the pivotal movement of said clamping bar, on said last mentioned support, said limiting means being arranged to act simultaneously with the co-action of the stop on said clutch collar with the clamping bar, during the upward movement of said pivotal support.

23. In a slicing machine, a meat clamping bar, an adjustable pivotal support for one end of said bar, means for preventing adjustment of said support in one direction while said bar is moved about said pivot through a limited angle, but controlled by said bar to permit such adjustment when said bar reaches the limit of said angle, means attached to the other end of said bar for adjusting said bar and for moving it about said pivot, and a stop carried by said last mentioned means arranged to hold said bar at the limit of its angular movement about its pivot during adjustment of said bar in the direction before-mentioned.

24. In a slicing machine, a clamping bar, a movable pivotal support for each end of said bar, means for holding one end of said bar stationary during limited movement of the other end thereof to cause rotation of said bar on said pivots, means on the support for said second-mentioned end for limiting said rotation and means on the support for said first-mentioned end for releasing the holding means for said end simultaneously with the action of said rotation limiting means whereby further movement of said second-mentioned end will move said bar bodily.

25. In combination, a meat supporting table, an upright guide member secured to said table near one edge thereof, a second upright guide member secured to said table at a greater distance from said edge than said first upright guide member, a clamping bar arranged substantially parallel with said edge and having one end slidably mounted on said first guide member and its other end slidably supported from said second guide member, and a single means for adjusting both ends of said clamping bar.

26. In combination, a meat supporting table, an upright guide bar secured to said table near one edge thereof, a second upright guide bar secured to said table at a greater distance from the edge than said first upright guide bar, a meat clamping bar slidably and pivotally carried on said first upright guide bar and substantially parallel with said edge and means mounted on said second upright guide bar for adjusting said meat clamping bar on said first upright guide bar.

27. In combination, a meat supporting table, an upright guide bar mounted on said table near one edge thereof, a second upright guide bar mounted on said table at a greater distance from said edge than said first upright guide bar, a meat clamping bar substantially parallel with said edge and having its ends respectively carried by said guide-bars, and a single means for adjusting said meat clamping bar on both of said guide bars.

28. In combination, a meat supporting table, an upright guide bar carried by said table near one edge thereof, a second upright guide bar carried by said table at a greater distance from said edge than said first upright guide bar, a meat clamping bar having its ends pivotally and slidably mounted on said guide bars respectively, and means carried by said second guide bar for adjusting said meat clamping bar on both of said guide bars.

29. In combination, a meat supporting table, an upright guide bar mounted on said table near one edge thereof, a second upright guide bar mounted on said table at a greater distance from said edge than said first upright guide bar, a meat clamping bar having one end thereof carried by said first upright guide bar, a bracket mounted on said second upright guide bar and arranged to support the other end of said meat clamping bar to hold said clamping bar substantially parallel to said aforementioned edge of said meat supporting table, and a single means for adjusting said bracket and meat clamping bar relative to said guide bars.

30. In combination, a meat supporting table, an upright guide bar mounted on said table near one edge thereof, a collar slidably mounted on said guide bar, a second upright guide bar mounted on said table at a greater distance from said edge than said first guide bar, a bracket slidably mounted on said second guide bar, a clamping bar having one end pivotally carried by said collar and the other end pivotally carried by said bracket, and arranged to lie in a vertical plane substantially parallel with said aforementioned edge of said table, and means for adjusting both ends of said clamping bar by a movement of said bracket on said second guide bar.

31. In combination, a meat clamping table, an upright guide bar mounted on said table near one edge thereof, a second upright guide bar mounted on said table at a greater distance from said edge than said first upright guide bar, a collar slidably mounted on said first upright guide bar and arranged to clutch said guide bar to prevent upward movement of said collar thereon, a clamping bar pivotally carried by said collar and adapted, when held at a certain angle, to prevent the clutching operation of said collar, and means carried by said bracket for moving said clamping bar and adapted to hold said clamping bar at said angle to prevent the clutching operation of said collar.

32. In combination, an upright guide member, a collar slidably mounted on said guide member, a clamping bar having one end pivotally mounted on said collar, means secured to the other end of said clamping bar for moving said end in a vertical plane, whereby said bar is pivotally moved through a certain angle on said collar, and means for causing said collar to move upon said guide bar when said clamping bar is moved in one direction an amount greater than that for producing said angular movement on said collar.

In testimony whereof I have signed my name to this specification, in the presence of two subscribing witnesses, on this 19th day of July, A. D. 1915.

WILHELMUS A. van BERKEL.

Witnesses:
JOHANNES KLEINE,
LAMBERTUS D. M. SCHIPHORST.